United States Patent

Kaneko et al.

[11] Patent Number: 6,115,668
[45] Date of Patent: Sep. 5, 2000

[54] NAVIGATION APPARATUS FOR DETECTING A PRESENT POSITION OF A MOVEABLE BODY

[75] Inventors: Hitoshi Kaneko; Masaya Hashida; Yoshiaki Matsumoto; Tatsuya Okamoto; Motoki Ishiguro, all of Kawagoe, Japan

[73] Assignee: Pioneer Electronic Corporation, Japan

[21] Appl. No.: 09/035,911

[22] Filed: Mar. 6, 1998

[30] Foreign Application Priority Data

Mar. 7, 1997 [JP] Japan ................................. 9-053613
Mar. 7, 1997 [JP] Japan ................................. 9-053614

[51] Int. Cl.$^7$ .................................................. G06G 7/78
[52] U.S. Cl. .................. 701/207; 701/208; 701/209; 73/178 R; 340/988
[58] Field of Search .................................. 701/207, 201, 701/208, 209, 213, 214, 215, 216, 217, 224; 342/357, 457, 357.14; 356/5.08, 28; 340/436, 988, 990, 995; 73/178 R

[56] References Cited

U.S. PATENT DOCUMENTS 4,586,138   4/1986   Mullenhoff et al. ..................... 701/1
4,741,207   5/1988   Spangler ................................. 73/146
5,187,977   2/1993   Koschorek et al. ..................... 73/146
5,574,649   11/1996   Levy ..................................... 701/200
5,902,348   5/1999   Okamoto et al. ....................... 701/201
5,949,375   9/1999   Ishiguro et al. ....................... 701/216

FOREIGN PATENT DOCUMENTS 0 534 892 A1   9/1992   European Pat. Off. .
0 662 602 A1   12/1994   European Pat. Off. .
31 43 234 A1   10/1981   Germany .
3439000 A1   10/1984   Germany .

OTHER PUBLICATIONS

European Search Report dated Aug. 5, 1999.

*Primary Examiner*—Jacques H. Louis-Jacques
*Attorney, Agent, or Firm*—Finnegan, Henderson, Farabow, Garrett & Dunner, L.L.P.

[57] ABSTRACT

A navigation apparatus provided with: a vertical movement detecting device for detecting a presence or absence of a movement in a vertical direction of a moveable body associated with the movement of the movable body; a judging device for judging a position in the vertical direction of the movable body on the basis of the presence or absence of the movement in the vertical direction detected by the detecting device; and a notifying device for notifying a present position of the movable body on the basis of the position in the vertical direction judged by the judging device.

16 Claims, 8 Drawing Sheets

NAVIGATION APPARATUS FOR DETECTING A PRESENT POSITION OF A MOVEABLE BODY

BACKGROUND OF THE INVENTION

1. Field of the Invention

The present invention relates to a navigation apparatus, which is mounted in a movable body, such as a vehicle or the like, and detects a present position, a travel direction, a travel distance and the like of the movable body while it is moving, to indicate the present position of the movable body on a map shown on a display, and accordingly assists the movement to a destination of the movable body.

2. Description of the Related Art

As a measuring apparatus for a movable body such as a vehicle, an airplane, a ship or the like, there is a so-called navigation apparatus which superimposes and shows, on a map including the present position of the movable body, a position mark indicating the present position of the movable body, to accordingly perform a route guidance to a destination. Among the navigation apparatuses, a vehicle navigation apparatus mounted in the vehicle is roughly classified into a self sustained navigation apparatus and a GPS (Global Positioning System) navigation apparatus.

The former type determines a travel distance of the vehicle by using a travel distance sensor equipped in the vehicle and calculates a speed and an acceleration of the vehicle by using an acceleration sensor equipped in the vehicle, and then adds the travel distance to a standard location to thereby calculate the present position and display the corresponding map and the position mark on the displayed map on the basis of the calculated present position. Incidentally, in the conventional process of calculating the travel distance, it is calculated by using a so-called vehicle speed pulse signal for a speed meter (i.e., a vehicle speed pulse signal having a predetermined pulse number for each tire rotation) to thereby count the pulse number.

On the other hand, the latter type receives measurement electric waves from a plurality of GPS satellites launched in the space, and then calculates the present position (i.e. the absolute position) of the vehicle by using a three-dimension survey method or a two-dimension survey method based on the received result, to thereby display the corresponding map and the position mark on the displayed map on the basis of the calculated absolute position.

The navigation apparatus using the latter GPS among them is characterized in that it is not necessary to input in advance a position of the self vehicle on the map and further a measurement error of the present position is extremely small, so that a high reliability can be obtained.

However, the navigation apparatus using the GPS type has such a defect that the measurement cannot be done when the self vehicle is located at the shade which causes the reception of the electric wave to be difficult, such as the shade of a tall building, the inside of a tunnel, the inside of a forest and the like. The self-sustained measurement type of the navigation apparatus has such a defect that it is easily subjected to the effects resulting from the factors inside and outside the vehicle, such as the effects of an accumulated error, a temperature variation and the like and thereby the output data is not always accurate.

Thus, a so-called hybrid type of a navigation apparatus is developed in which both of the GPS type and the self-sustained measurement type are used to mutually correct the respective defects.

It is known that in recent years, there are a plurality of roads extremely adjacent to each other associated with the development of a road network, in many cases. More actually, for example, there is a case that a general road runs parallel to and exists just under an elevated express way (i.e., a road dedicated to a car), or there is a case that at a grade separation, in addition to an overpass at the grade separation, a road as a side-road runs parallel to the overpass and exists under the grade separation.

Hence, it is necessary to properly consider and show the existing road even for a vehicle traveling through the location at which a plurality of roads having altitudinal differences are adjacent to each other.

However, the map displayed on the display is a basically flat map in the conventional navigation apparatus. Thus, the position of the vehicle is flatly considered in the navigation apparatus. In other words, it is displayed by considering only a positional relation when projecting the position of the vehicle onto a horizontal surface.

Hence, when the plurality of roads having the attitudinal differences are extremely adjacent to each other (e.g., the roads are overlapped on a flat surface, depending on a condition), it is difficult to exactly determine a road on which the vehicle is traveling, by the measurement accuracy of the current navigation apparatus. This results in a problem that an erroneous guidance may be performed.

This problem is a serious problem which has a great influence on an accuracy of a navigation process, in the present day when the roads are complicatedly developed as mentioned above.

By the way, the conventional hybrid type of the navigation apparatus uses an output of the moving distance sensor as it is, as the moving distance of the vehicle. However, when considering the actual movement of the vehicle, there are many cases of the travel on an upward slope and a downward slope as well as the movement within a horizontal surface. At this time, a map displayed on the display picture is normally flat (two-dimension) with a horizontal surface as a standard. Thus, in a case of the upward slope or the downward slope, the actually moving distance becomes longer than a moving distance on the two-dimension flat plane (within a horizontal surface). Hence, if in this case, as mentioned above, the output of the moving distance sensor as it is, is used as the moving distance of the vehicle and then the position mark is displayed on the display picture, the display position of the position mark on the map is far away from the actual present position. This results in a problem that the position display and the guidance cannot be performed exactly.

Therefore, the conventional vehicle navigation apparatus is equipped with an inclination instrument for detecting an inclination of the vehicle, and uses the detected inclination and then corrects the moving distance and the like and thereby guides the vehicle.

As an example of the inclination instrument, two piezo type semiconductor acceleration sensors may be prepared such that a sensitive axis of one acceleration sensor is coincident with a travel direction of a vehicle and a sensitive axis of the other acceleration sensor is mounted in a direction vertical to the travel direction of the vehicle, for example, as disclosed in Japanese Patent Application Laying Open (KOKAI) No.8-297033 (especially, FIG. 3 and the related explanation thereof). Then, the acceleration in the travel direction of the vehicle is determined by the acceleration sensor whose sensitive axis is coincident with the travel direction of the vehicle, and also an acceleration in a direction parallel to a gravitational acceleration is calculated by the other acceleration sensor whose sensitive axis is vertical to the travel direction of the vehicle, and further the calculated acceleration in the direction parallel to the gravitational acceleration is compared with the gravitational acceleration, and accordingly the inclination of the vehicle is determined.

However, the technique disclosed in the above mentioned Japan Patent Application Laying Open (KOKAI) No.8-297033 requires the two (two-axis) acceleration sensors. Thus, this results in another problem that the configuration of the whole navigation apparatus is complex and the price is expensive.

Moreover, a vibration and the like associated with the movement of the vehicle are superimposed on the output signal of the acceleration sensor as a noise component, in the acceleration sensor for detecting the gravitational acceleration. Hence, this results in another problem that the process with a complexity and a high level is required in order to remove then noise component.

Furthermore, the mount of the two acceleration sensors requires that the sensitive axes thereof are orthogonal to each other at an extremely high accuracy. The orthogonal accuracy is poor in the actual vehicle. Hence, this results in another problem that the exact inclination angle may not be calculated.

SUMMARY OF THE INVENTION

The present invention is proposed in view of the above mentioned problems. It is therefore a first object of the present invention to provide a navigation apparatus which can perform a navigation process by exactly determining any one road of a plurality of roads on which a vehicle is traveling, even when the vehicle is traveling near the locations having the altitudinal differences.

It is a second object of the present invention to provide a navigation apparatus, which can judge an inclined state in a travel direction of a vehicle in a simple cheap configuration and perform a guiding process more exactly since the judgment is reflected in the process.

The first object of the present invention can be achieved by a first navigation apparatus provided with: a vertical movement detecting device such as a CPU (Central Processing Unit) or the like for detecting a presence or absence of a movement in a vertical direction of a movable body associated with the movement of the movable body; a judging device such as a CPU for judging a position in the vertical direction of the movable body on the basis of the presence or absence of the movement in the vertical direction detected by the vertical movement detecting device; and a notifying device such as a CPU for notifying a present position of the movable body on the basis of the position in the vertical direction judged by the judging device.

According to the first navigation apparatus, the presence or absence of the movement in the vertical direction of the movable body is detected by the vertical movement detecting device. Then, on the basis of this presence or absence of the movement in the vertical direction, the position in the vertical direction of the movable body is judged by the judging device. Finally, on the basis of this position in the vertical direction, the present position of the movable body is notified by the notifying device. Thus, the notification for the moving condition of the movable body can be appropriately performed. Therefore, the navigation process, which is more accurate than that in the conventional art, can be performed by the first navigation apparatus.

The first object of the present invention can be also achieved by a second navigation apparatus provided with: a vertical movement detecting device for detecting a presence or absence of a movement in a vertical direction of a movable body associated with the movement of the movable body; a judging device for judging whether or not the movable body moves on an inclined surface on the basis of the presence or absence of the movement in the vertical direction detected by the vertical movement detecting device; and a notifying device for notifying a present position of the movable body on the basis of a judgment result of the judging device.

According to the second navigation apparatus, the presence or absence of the movement in the vertical direction of the movable body is detected by the vertical movement detecting device. Then, on the basis of this presence or absence of the movement in the vertical direction, whether or not the movable body moves on an inclined surface is judged by the judging device. Finally, on the basis of this judgment result of the judging device, the present position of the movable body is notified by the notifying device. Thus, the notification for the moving condition of the movable body can be appropriately performed. Therefore, the navigation process, which is more accurate than that in the conventional art, can be performed by the second navigation apparatus.

The first object of the present invention can be also achieved by a third navigation apparatus provided with: a recognizing device such as a CPU or the like for recognizing a present position of a movable body; a storing device such as an information record disc (e.g., a DVD-ROM, a CD-ROM) or the like for storing map information including a region where the movable body moves; and a vertical movement detecting device such as a CPU or the like for detecting a presence or absence of a movement in a vertical direction of the movable body associated with the movement of the movable body, wherein the recognizing device recognizes the present position of the movable body on the basis of the map information stored by the storing device and the presence or absence of the movement in the vertical direction detected by the vertical movement detecting device.

According to the third navigation apparatus, the present position of the movable body is recognized by the recognizing device. On the other hand, the map information including a region where the movable body moves is stored in the storing device. Along with this recognition, the presence or absence of the movement in the vertical direction of the movable body is detected by the vertical movement detecting device. At this time, on the basis of the map information stored by the storing device and the presence or absence of the movement in the vertical direction detected by the vertical movement detecting device, the present position of the movable body is recognized by the recognizing device. Thus, it is possible to precisely recognize the present position. Therefore, the navigation process, which is more accurate than that in the conventional art, can be performed by the third navigation apparatus.

In one aspect of the third navigation apparatus, the movable body is a vehicle, the map information includes attitudinal difference information indicating attitudinal differences between a plurality of roads, and the recognizing device uses the attitudinal difference information stored by the storing device and the presence or absence of the movement in the vertical direction detected by the vertical movement detecting device to thereby recognize one of the plurality of roads on which the vehicle is traveling.

According to this one aspect of the third navigation apparatus, one of the plurality of roads on which the vehicle is traveling is recognized by the recognizing device, on the basis of the attitudinal difference information, which is included in the map information and is stored by the storing device, as well as the presence or absence of the movement in the vertical direction detected by the vertical movement detecting device. Thus, even while the vehicle is moving on one of the roads, which are different in the altitude from each other and are close or adjacent to each other, it is still possible to precisely recognize the present position.

In this one aspect of the third navigation apparatus, the vertical movement detecting device may be provided with: an acceleration detecting device such as an acceleration sensor, a CPU and the like for detecting an acceleration applied to the movable body in the moving direction of the movable body; and a moving distance detecting device for detecting a moving distance of the movable body, so as to detect the presence or absence of the movement in the vertical direction of the movable body, on the basis of the acceleration detected by the acceleration detecting device and the acceleration based on the moving distance detected by the moving distance detecting device.

In this case, the acceleration applied to the movable body in the moving direction of the movable body is detected by the acceleration detecting device. The moving distance of the movable body is detected by the moving distance detecting device, so that, on the basis of this acceleration detected by the acceleration detecting device and the acceleration based on this moving distance detected by the moving distance detecting device, the presence or absence of the movement in the vertical direction of the movable body is detected by the vertical movement detecting device. Thus, it is possible to precisely judge the position in the vertical direction of the movable body by detecting the presence or absence of the movement in the vertical direction, by use of a rather simple construction without suffering from the influence of the vibration or the like associated with the movement of the movable body.

In this one aspect of the third navigation apparatus also, the plurality of roads may be a plurality of roads constituting a grade separation, and the recognizing device may recognize whether or not the vehicle is moving on one of the roads at an upper side of the grade separation or moving on another of the roads at a lower side of the grade separation.

In this case, it is recognized by the recognizing device whether or not the vehicle is moving on one of the roads at an upper side of the grade separation or moving on another of the roads at a lower side of the grade separation. Thus, it is possible to recognize the present position precisely even while the vehicle is moving on the grade separation.

In this one aspect of the third navigation apparatus also, the plurality of roads may be an express way and a general road other than the express way, and the recognizing device may recognize one of the express way and the general road on which the vehicle is moving.

In this case, one of the express way and the general road on which the vehicle is moving is recognized by the recognizing device. Thus, it is possible to recognize the present position precisely even if it is such a position where the express way and the general road are close or adjacent to each other.

In this one aspect of the third navigation apparatus also, the third navigation apparatus may be further provided with: a display device for displaying a map corresponding to the map information; and a display control device such as a CPU or the like for controlling the display device to display the map including the present position of the movable body and display the present position recognized by the recognizing device on the road to which the present position within the displayed map corresponds. Thus, even while the vehicle is moving on one of the roads, which are different in the altitude from each other and are close or adjacent to each other, it is still possible to precisely recognize and display the present position.

In one aspect of the first or second navigation apparatus, the notifying device is provided with at least one of a display device for visually notifying the present position and an acoustic reproducing device for audibly notifying the present position.

According to this one aspect of the first or second navigation apparatus, the present position is visually notified by the display device, or the present position is audibly notified by the acoustic reproducing device. Thus, it is easy for the user or driver to understand the notification by watching or listening to it.

The second object of the present invention can be achieved by a first movement judging apparatus provided with: an acceleration detecting device such as an acceleration sensor, a CPU and the like for detecting an acceleration applied to a movable body in a moving direction of the movable body; a moving distance detecting device such as a CPU for detecting a moving distance along the moving direction of the movable body; and a judging device such as a CPU for judging whether or not the moving direction of the movable body is inclined, on the basis of (i) an acceleration based on the moving distance detected by the moving distance detecting device and (ii) the acceleration detected by the acceleration detecting device.

According to the first movement judging apparatus, the acceleration applied to the movable body in the moving direction is detected by the acceleration detecting device. Along with this, the moving distance along the moving direction is detected by the moving distance detecting device. Then, on the basis of (i) the acceleration based on this moving distance detected by the moving distance detecting device and (ii) this acceleration detected by the acceleration detecting device, it is judged by the judging device whether or not the moving direction is inclined. Thus, it is possible to precisely judge whether or not the moving direction is inclined, by use of a rather simple construction without suffering from the influence of the vibration or the like associated with the movement of the movable body. Therefore, the navigation process, which is more accurate than that in the conventional art, can be performed by virtue of the judgment result of the first movement judging apparatus.

The second object of the present invention can be also achieved by a second movement judging apparatus provided with: an acceleration detecting device such as an acceleration sensor, a CPU and the like for detecting an acceleration applied to a movable body in a moving direction of the movable body; a moving distance detecting device such as a CPU or the like for detecting a moving distance along the moving direction of the movable body; and a judging device such as a CPU or the like for judging a presence or absence of a movement in a vertical direction of the movable body, on the basis of (i) an acceleration based on the moving distance detected by the moving distance detecting device and (ii) the acceleration detected by the acceleration detecting device.

According to the second movement judging apparatus, the acceleration applied to the movable body in the moving direction is detected by the acceleration detecting device. Along with this, the moving distance along the moving direction is detected by the moving distance detecting device. Then, on the basis of (i) the acceleration based on this moving distance detected by the moving distance detecting device and (ii) this acceleration detected by the acceleration detecting device, the presence or absence of the movement in the vertical direction of the movable body is judged by the judging device. Thus, it is possible to precisely judge the presence or absence of the movement in the vertical direction of the movable body, by use of a rather simple construction without suffering from the influence of the vibration or the like associated with the movement of the movable body. Therefore, the navigation process, which is more accurate than that in the conventional art, can be performed by virtue of the judgment result of the second movement judging apparatus.

In one aspect of the first or second movement judging apparatus, the first movement judging apparatus is further provided with a calculating device for calculating an inclination angle in the moving direction of the movable body, on the basis of (i) the acceleration based on the moving distance detected by the moving distance detecting device, (ii) the acceleration detected by the acceleration detecting device and (iii) a gravitational acceleration.

According to this one aspect of the first or second movement judging apparatus, on the basis of (i) the acceleration based on this moving distance detected by the moving distance detecting device, (ii) this acceleration detected by the acceleration detecting device and (iii) the gravitational acceleration, the inclination angle in the moving direction is calculated by the calculating device. Accordingly, it is possible to judge the inclination condition of the movable body in the moving direction more precisely and more concretely.

In this one aspect of the first or second movement judging apparatus, the judging device may judge that the moving direction of the movable body is inclined when the calculated inclination angle is equal to or more than a predetermined angle.

In this case, if the calculated inclination angle is equal to or more than a predetermined angle, it is judged by the judging device that the moving direction of the movable body is inclined. Thus, even in case that noise components or the like are included in the calculated inclination angle, it is still possible to surely judge the presence or absence of the inclination of the movable body in the moving direction.

In another aspect of the first or second movement judging apparatus, the moving distance detecting device calculates the moving distance on the basis of a speed signal corresponding to the movement of the movable body.

According to this another aspect of the first movement judging apparatus, on the basis of the speed signal corresponding to the movement of the movable body, the moving distance is calculated by the moving distance detecting device. Thus, it is possible to judge the presence or absence of the inclination by precisely detecting the moving distance.

The second object of the present invention can be also achieved by a fourth navigation apparatus provided with (a) the aforementioned first movement judging apparatus of the present invention, (b) a correcting device such as a CPU or the like for correcting the moving distance detected by the moving distance detecting device, on the basis of a judgment result of the judging device, and (c) a display device for displaying a moving condition including a present position of the movable body, on the basis of the moving distance corrected by the correcting device.

According to the fourth navigation apparatus, on the basis of a judgment result of the judging device in the first movement judging apparatus, the moving distance detected by the moving distance detecting device in the first movement judging apparatus is corrected by the correcting device. Then, on the basis of the moving distance corrected by the correcting device, the moving condition including the present position of the movable body is displayed by the display device. Thus, it is possible to accurately display the moving condition of the movable body. Therefore, the navigation process, which is more accurate than that in the conventional art, can be performed by the fourth navigation apparatus.

The second object of the present invention can be also achieved by a fifth navigation apparatus provided with (a) the aforementioned second movement judging apparatus of the present invention (b) a correcting device for correcting the moving distance detected by the moving distance detecting device, on the basis of a judgment result of the judging device, and (c) a display device for displaying a moving condition including a present position of the movable body, on the basis of the moving distance corrected by the correcting device.

According to the fifth navigation apparatus, on the basis of a judgment result of the judging device in the second movement judging apparatus, the moving distance detected by the moving distance detecting device in the second movement judging apparatus is corrected by the correcting device. Then, on the basis of the moving distance corrected by the correcting device, the moving condition including the present position of the movable body is displayed by the display device. Thus, it is possible to accurately display the moving condition of the movable body. Therefore, the navigation process, which is more accurate than that in the conventional art, can be performed by the fourth navigation apparatus.

In one aspect of the fourth or fifth navigation apparatus, the first or second movement judging apparatus is further provided with a calculating device for calculating an inclination angle in the moving direction of the movable body, on the basis of (i) the acceleration based on the moving distance detected by the moving distance detecting device, (ii) the acceleration detected by the acceleration detecting device and (iii) a gravitational acceleration, and the correcting device corrects the moving distance detected by the moving distance detecting device, on the basis of the inclination angle calculated by the calculating device.

According to this one aspect of the fourth or fifth navigation apparatus, on the basis of the inclination angle calculated by the calculating device, the moving distance detected by the moving distance detecting device is corrected by the correcting device. Accordingly, it is possible to more precisely and more concretely display the moving condition of the movable body.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Next, preferred embodiments of the present invention will be explained with reference to the drawings. In the embodiments described below, the present invention is applied to a case of determining, in a navigation apparatus equipped in a vehicle, an inclination of the vehicle (which is defined as an angle between a horizontal surface and the advance direction of the vehicle) to thereby determine a road on which the vehicle is traveling.

(I) Configuration and Schematic Operation

At first, the configuration and the schematic operation of the navigation apparatus according to the embodiment of the present invention is explained with reference to FIG. 1.

Figure 1:
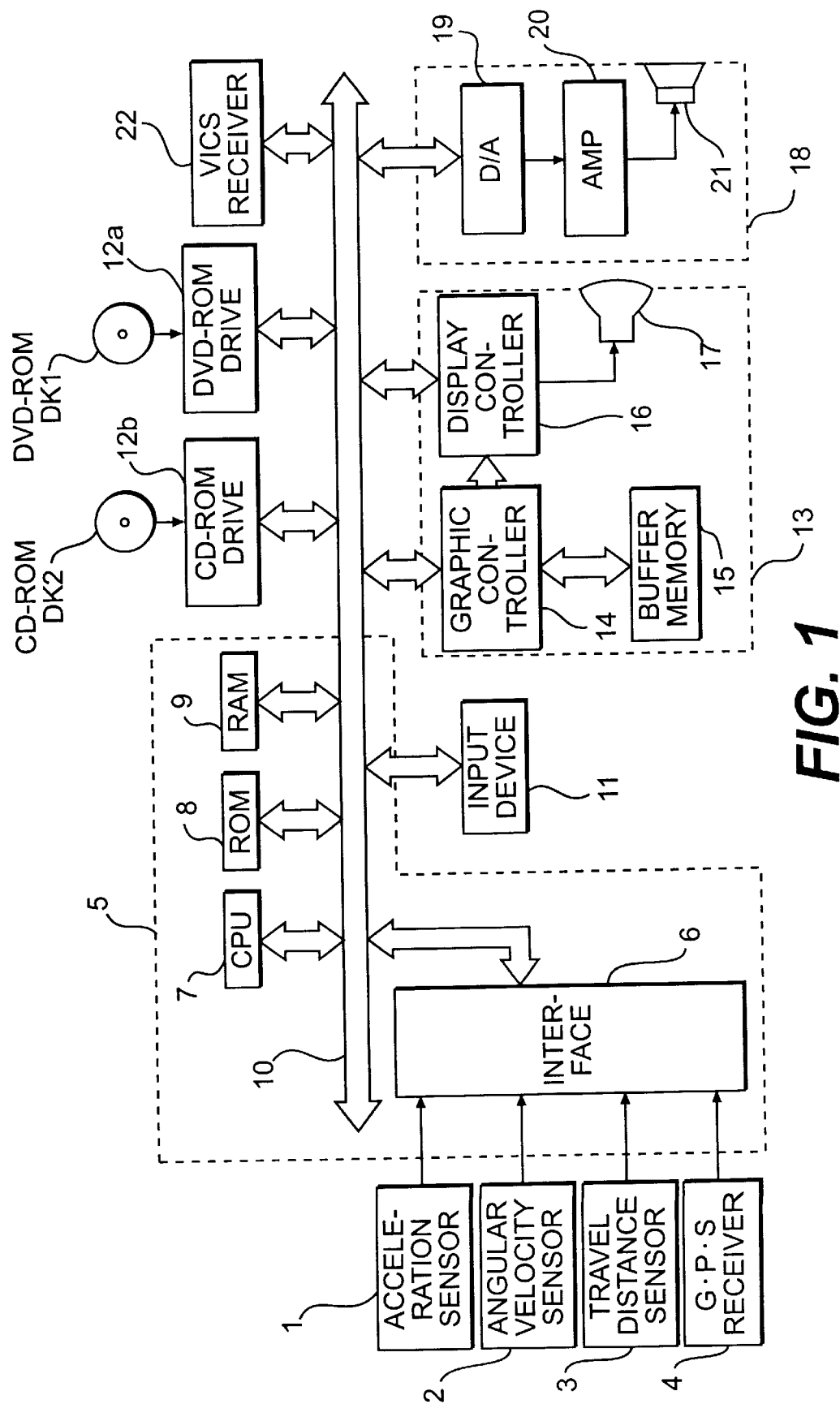
FIG. 1 is a block diagram of a navigation apparatus as an embodiment of the present invention.

As shown in FIG. 1, a navigation apparatus S according to this embodiment is provided with: a single axis acceleration sensor 1 servicing as one example of an acceleration detecting device for detecting an acceleration in a travel direction actually applied to the vehicle when the self vehicle is started, stopped, accelerated or decelerated and then outputting acceleration data; an angular velocity sensor 2 for detecting an angular velocity, for example, when a direction of the self vehicle is changed, and then outputting angular velocity data and relative azimuth data; a travel distance sensor 3 for outputting a vehicle speed pulse signal corresponding to a rotation of a tire; and a GPS receiver 4 for receiving electric waves from GPS satellites and then outputting GPS measurement data such as a latitude and a longitude at which the self vehicle is presently located, and further outputting the absolute azimuth data in the travel direction of the self-vehicle. Various types are actually used as the acceleration sensor 1, such as a capacitance type or a piezo type of a semiconductor acceleration sensor or a piezoelectric device type of an acceleration sensor.

Moreover, the navigation apparatus S is provided with: a system controller 5 for controlling the navigation apparatus S as a whole, on the basis of the acceleration data, the relative azimuth data, the angular velocity data, the vehicle speed pulse signal, the GPS measurement data and the absolute azimuth data which are outputted by the acceleration sensor 1, the angular velocity sensor 2, the travel distance sensor 3 and the GPS receiver 4, respectively; an input device 11, such as a remote controller, a touch panel or the like, for inputting various data; a DVD ROM drive 12a and a CD-ROM drive 12b for respectively reproducing, under the control of the system controller 5, a DVD ROM (DVD-Read Only Memory) disk DK1 and a CD-ROM (Compact Disk ROM) disk DK2 servicing as one example of a storing device for storing map information; a display unit 13 for displaying various display data under the control of the system controller 5; an acoustic reproducing unit 18 for reproducing and outputting various voice data under the control of the system controller 5; and a VICS receiver 22 for receiving traffic jam information based on the VICS (Vehicle Information and Communication System) whose practice use is promoted in recent years.

The map information stored in the DVD-ROM disk DK1 and the CD-ROM disk DK2 includes, as for a grade separation, the information indicating a position thereof, the information related to an overpass running over the grade separation and the information related to an underpass running thereunder for example, together with the distinction between the overpass and the underpass (e.g., the information indicating that a road A runs over the grade separation and a road B runs thereunder). Moreover, it includes, as for an express way and a general road, the information indicating respective positions and the information indicating that the express way runs over or under the general road (for example, the information indicating that an express way C runs over a road D).

On the other hand, the system controller 5 is provided with: an interface 6 for performing an interface operation for the external sensors i.e., the acceleration sensor 1, the angular velocity sensor 2, the travel distance sensor 3 and the GPS receiver 4; a CPU 7 servicing as one example of a detecting device, a judging device, a noting device, a recognizing device, an acceleration detecting device, a travel distance detecting device and a display control device, for counting the pulse number in the vehicle speed pulse signal and thereby calculating a travel distance of a vehicle C and further controlling the system controller 5 as a whole; an ROM (Read Only Memory) 8 in which a control program for controlling the system controller 5 and the like are stored; and an RAM 9 (Random Access Memory) in which various data such as route data predetermined through the input device 11 by a user and the like are stored in such a manner that they can be read and written. In the system controller 5, the DVD-ROM drive 12a, the CD-ROM drive 12b, the display unit 13, the acoustic reproducing unit 18 and the VICS receiver 22 are connected to the system controller 5 through a bus line 10. Moreover, the system controller 5 is connected through the interface 6 and the bus line 10 to the respective sensors and the like.

The display unit 13 is provided with: a graphic controller 14 for controlling the display unit 13 as a whole on the basis of the control data sent through the bus line 10 from the CPU 7; a buffer memory 15 consisting of memories of VRAM (Video RAM) for tentatively recording image information which can be instantly displayed; and a display controller 16 for display-controlling a display 17 servicing as one example of a display device, such as a liquid crystal, CRT (Cathode Ray Tube) and the like, on the basis of the image data outputted by the graphic controller 14.

The acoustic reproducing unit 18 is provided with: a D/A converter 19 for performing a D/A conversion of the voice digital data sent through the bus line 10 from the DVD ROM drive 12*a*, the CD ROM drive 12*b* or the RAM 9; an amplifier 20 for amplifying a voice analog signal outputted by the D/A converter 19; and a speaker 21 for converting the amplified voice analog signal into a voice and outputting it.

Next, the schematic operation is explained.

When the navigation apparatus S having the above mentioned configuration is actuated, the system controller 5 firstly reads out the information for the access to the map information, the display information such as the position mark of the self -vehicle and the like, from the DVD ROM disk DK1 or the CD-ROM disk DK2, and stores them into the RAM 9. Then, the system controller 5 reads the output of the travel distance sensor 3 (i.e., the vehicle speed pulse signal), calculates the travel distance on the basis of the read output, and further differentiates the calculated travel distance one time to thereby determine the speed.

Next, the system controller 5 reads the output of the angular velocity sensor 2 and calculates the travel direction on the basis of the read output. After that, the system controller 5 calculates the present position of the self-vehicle on the basis of the travel distance data and the travel direction data to thereby determine the present position of the self-vehicle. Then, the system controller 5 reads out the map information corresponding to the determined present position of the self-vehicle from the DVD-ROM disk DK1 or the CD-ROM disk DK2, outputs it to the graphic controller 14 and displays the map including the present position on the display 17.

At this time, the system controller 5 corrects the respective data calculated by the acceleration sensor 1 and the angular velocity sensor 2, on the basis of the speed data and the GPS measurement data outputted by the GPS receiver 4, at any time. Then, in accordance with the respective data, the system controller 5 updates the display direction and the display position of the position mark, and as necessary, the map displayed on the display 17.

Incidentally, the speed data is calculated by using the output signal from the travel distance sensor 3. In addition, it may be determined by integrating the output signal from the acceleration sensor 1 one time.

(II) Navigation Process

Figure 2:
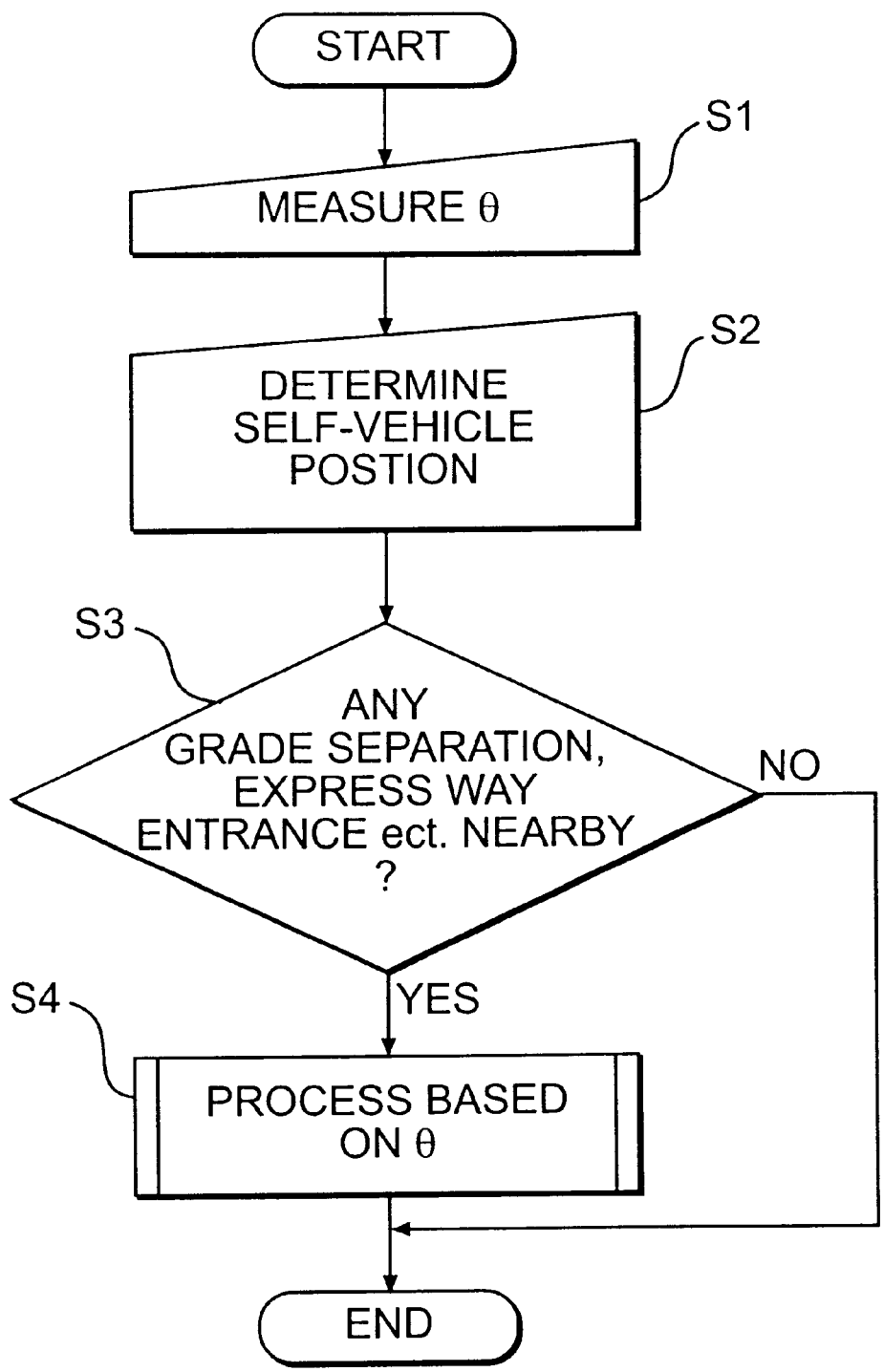
FIG. 2 is a flow chart showing an operation in a navigation process of the embodiment.

Next, the navigation process of this embodiment is explained with reference to FIGS. 2 to 6. FIGS. 2, 4 and 5 are flowcharts showing the processes mainly executed in the CPU 7.

Incidentally, as the premise of the processes described below, it is assumed that the vehicle is traveling on a general road (hereafter, this implies roads other than an express way).

In FIG. 2, in the navigation process of the embodiment, an inclination angle of the vehicle (hereafter, this implies an angle between the travel direction of the vehicle and a horizontal surface) is firstly obtained by using a method detailed later (Step S1).

Next, a so-called map matching process or the like is executed by using the information from the GPS, the travel distance sensor 3 and so on, and the present position of the self vehicle is determined (Step S2).

Then, it is judged by using the information as for the express way and the grade separation in the map information recorded on the DVD-ROM disk DK1 or the CD-ROM disk DK2, which indicates whether or not there exists an express way entrance or a grade separation near the determined present position of the self-vehicle and in the travel direction thereof (Step S3). If there exists no express way entrance or no grade separation near the position of the self-vehicle (Step S3; NO), the normal navigation process is continued without performing the process of using the inclination angle calculated at the step S1.

On the other hand, if there exists the express way entrance or the grade separation near the position of the self-vehicle in the judgment at the step S3 (Step S3; YES), the navigation process of using the inclination angle calculated at the step S1 is performed (Step S4). After that, the normal navigation process is continued. The process at the step S4 is detailed later.

Next, the measurement of the inclination angle of the vehicle executed at the step S1 is explained with reference to FIGS. 3 and 4.

Figure 3:
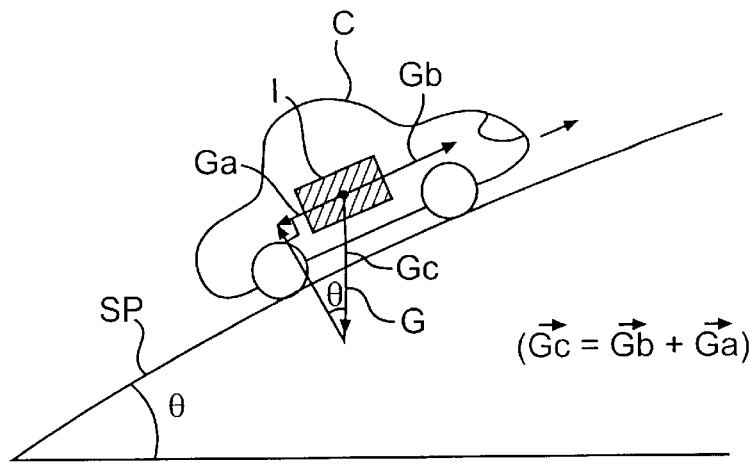
FIG. 3 is a diagram showing a principle for calculating an inclination angle in the embodiment.
Figure 4:
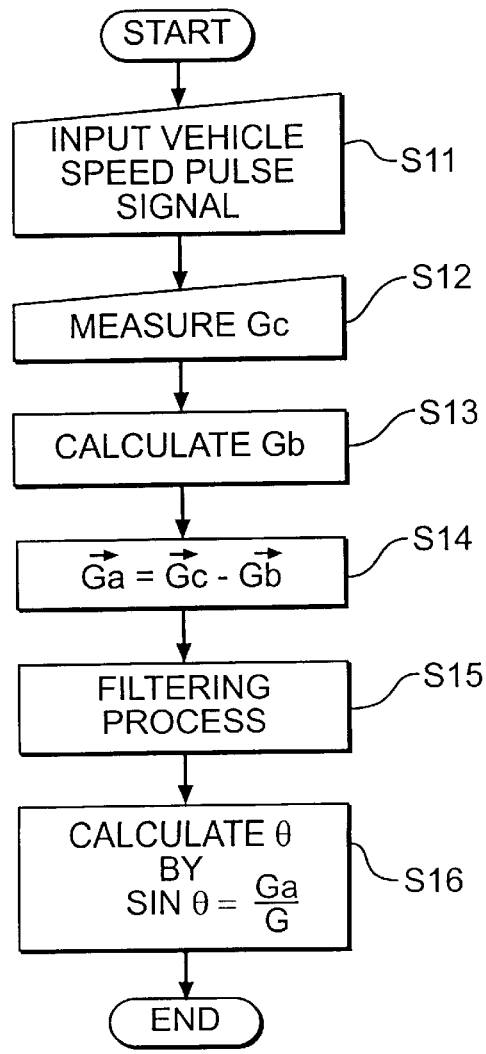
FIG. 4 is a flow chart showing an operation in an inclination angle calculating process of the embodiment.

At first, a principle when calculating the inclination angle of the vehicle at the step S1 is explained FIG.3.

FIG. 3 shows a state that the vehicle C is climbing an upward slope SP having an inclination angle $\theta$ and the speedup is also being performed. The vehicle C has the one axis acceleration sensor 1 for detecting the acceleration applied to the travel direction thereof, as mentioned above. At this time, a detection axis of the acceleration sensor 1 (i.e. a high sensitive direction) is parallel to the travel direction of the vehicle C.

Moreover, the vehicle C has the travel distance sensor 3 for outputting the vehicle speed pulse signal corresponding to the rotation of the tire.

In FIG. 3, a gravitational acceleration G is always vertically applied to the vehicle C climbing the upward slope SP while the speedup is performed. Now, it is assumed that a component in the travel direction of the vehicle C having the gravitational acceleration G is an acceleration Ga as shown in FIG.3.

On the other hand, when assuming an acceleration in the travel direction associated with the movement of the vehicle C to be Gb, the acceleration Gb is obtained by differentiating the travel distance calculated from the vehicle speed pulse, which is the output of the travel distance sensor 3, twice with respect to time. This acceleration Gb is applied to the vehicle C, in a direction shown in FIG.3.

Thus, an acceleration detected by the acceleration sensor 1 installed in the vehicle C is a vector sum of the acceleration Ga and the acceleration Gb from FIG.3.

Now, when assuming an acceleration detected by the acceleration sensor 1 to be Gc, since Gc=Ga+Gb (the vector sum), the acceleration Ga is determined as following by using a vector subtraction:

$$Ga=Gc-Gb$$

Accordingly, by using the determined acceleration Ga and the gravitational acceleration G, an inclination angle $\theta$ is calculated in accordance with the following equation (1):

$$\theta=\sin^{-1}(|Ga|/|G|) \qquad (1)$$

Then, the process shown at the step S4 is performed by using the calculated inclination angle $\theta$.

Next, an actual example of the process of calculating the inclination angle $\theta$ at the step S1 is explained with reference to FIG. 4.

As shown in FIG. 4, at the process of calculating the inclination angle $\theta$, the vehicle speed pulse signal from the travel distance sensor 3 is firstly inputted to the CPU 7 (Step S11).

Next, the acceleration Gc in the travel direction actually applied to the vehicle C (refer to FIG. 3) is measured by the travel distance sensor 3 (Step S12).

Then, the CPU 7 calculates distance data from the inputted vehicle speed pulse signal and further differentiates the distance data twice with respect to time to thereby calculate the acceleration Gb (refer to FIG. 3) associated with the movement in the travel direction of the vehicle C (Step S13).

Next, the acceleration Gb calculated from the measured acceleration Gc is vectorially subtracted to thereby calculate the acceleration Ga (refer to FIG. 3) which is the component in the travel direction of the vehicle having the gravitational acceleration G (Step S14).

Then, a low pass filter and the like are used to perform a filtering process of removing a noise component due to the vibration of the vehicle C, a time delay resulting from a transient phenomena at each sensor, an error resulting from an effect of a so-called knocking of the vehicle C and the like, from the result calculated at the step S14 (Step S15).

After that, the acceleration Ga filter-processed and the =gravitational acceleration G are used to calculate the inclination angle θ from the equation (1) and output it (Step S16).

The process of calculating the inclination angle θ shown in FIG. 4 is always executed every predetermined cycle while the navigation apparatus S is active.

The variations of the accelerations Gb and Gc associated with the travel of the vehicle C are actually explained in a column of an embodiment described later.

Next, the navigation process (the step S4 in FIG. 2) of the embodiment performed by using the inclination angle θ calculated at the above mentioned processes is explained with reference to FIGS. 5 and 6.

At first, a process of using the inclination angle θ when traveling from the general road to the express way is explained with reference to FIGS. 5A and 6A.

Figure 5A:
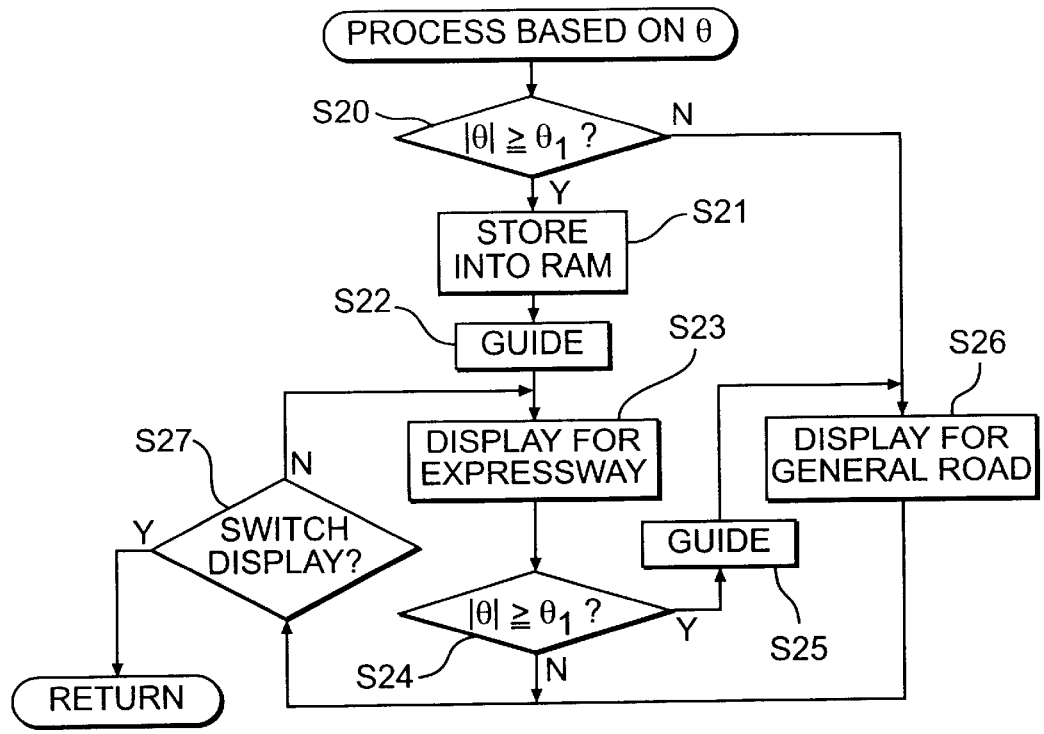
FIG. 5A is a flow chart showing a detailed operation in the navigation process for traveling an express way or a general road of the embodiment.

At the process executed when traveling from a general road to an express way whose presence is recognized at the step S3, it is firstly judged whether or not an absolute value of the inclination angle θ calculated at the step S1 is equal to or more than a predetermined threshold θ1 (Step S20) in FIG. 5A. The threshold θ1 implies a threshold set by considering, when traveling from a general road 26 through an upward slope 27 to an express way 25, a typical slant of the upward slope 27, as shown in FIG. 6A.

If the absolute value of the inclination angle θ is less than the threshold θ1 in the judgment at the step S20 (Step S20; NO), it is assumed that the vehicle C is continuously traveling on the flat general road 26, and then an indication implying that the vehicle C is traveling on the general road is continuously displayed by the navigation process using the usual map matching and the like (Step S26). Then, the operational flow proceeds to a step S27. In the indication at the step S26, for example, when the express way 25 and the general road 26 are adjacent to each other, this implies that the position mark of the vehicle C is exactly placed on the general road 26.

On the other hand, if the absolute value of the inclination angle θ is equal to or more than the threshold θ1 at the judgment of the step S20 (Step S20 ; YES), it is assumed that the vehicle C leaves the general road 26, climbs the upward slope 27 and travels to the express way 25, on the basis of the express way information among the stored road information, and then the assumed content is tentatively stored into the RAM 9 or the like (Step S21). Next, a guide process indicating that the vehicle C travels to the express way 25 is performed by voice and the like (Step S22). For example, a voice guide as shown in FIG. 6A is outputted in this guide process.

Next, an indication of traveling on the express way 25 is displayed by the navigation process using the usual map matching and the like (Step S23). When the express way 25 and the general road 26 are adjacent to each other in the display at the step S23, this implies that the position mark of the vehicle C is exactly placed on the express way 25. Moreover, at the step S23, it is judged that the vehicle C travels on the express way 25 until the operational flow proceeds to and after a next step S24. The judged result is reflected in the map matching, the voice guide and the like, and then the navigation process is continued.

Next, it is again judged whether or not the absolute value of the inclination angle θ periodically calculated at the step S1 is equal to or more than the threshold θ1 (Step S24). If it is less than the threshold θ 1 (Step S24 ; NO), it is assumed that the vehicle C is continuously traveling on the express way 25. Then, it is judged whether or not a signal for switching a current express way indication on the display 17 is inputted by the input device 11 (Step S27). If the signal for switching is inputted (Step S27 ; YES), the process corresponding to the input from the input device 11 is performed. If the signal for switching is not inputted (Step S27 ; NO), an indication of continuously traveling on the express way 25 is displayed (Step S23).

On the other hand, if the absolute value of the inclination angle θ is equal to or more than the threshold θ1 in the judgment at the step S24 (Step S24 ; YES), it is assumed that the vehicle C leaves the express way 25 and travels to the general road, on the basis of the express way information among the stored road information, and the guide process of traveling to the general road is performed by voice and the like (Step S25). For example, a fare from a travel point to the express way 25 stored at the step S21 and the like are outputted as a voice guide, in this guide process.

Then, an indication of traveling on the general road is displayed (Step S26) after the guide process at the step S25.

The repetition of the above explained processes at the steps S20 to S27 enables the exact execution of the navigation process associated with the travel to the express way 25 from the general road 26 or the travel to the general road 26 from the express way 25, even when the general road 26 and the express way 25 are adjacent to each other.

Figure 6A:
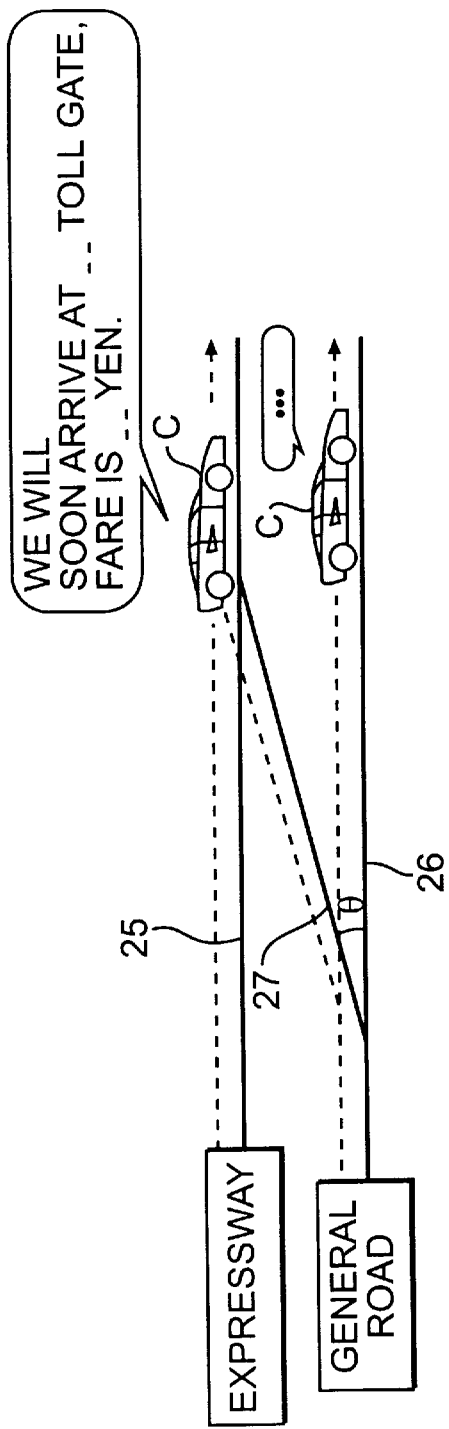
FIG. 6A is a diagram showing a concept of the navigation process for traveling the express way or the general road of the embodiment.

The comparison between the absolute value of the inclination angle θ and the threshold θ1 at the step S20 or S24 enables the exact execution of a series of the processes shown in FIG. 5A, not only in the case that the express way 25 runs over the general road 26 as shown in FIG. 6A, but also in the case that the express way 25 runs under the general road 26.

Moreover, the present position of the vehicle C can be exactly determined and displayed, even when an upward lane and a downward lane on the express way 25 are adjacent to each other beyond a measurement accuracy of each sensor, if adding the information to distinguish between the upward lane and the downward lane as the road information at the step S23.

Next, a process of using the inclination angle θ when traveling through the grade separation is explained with reference to FIGS. 5B and 6B.

Figure 6B:
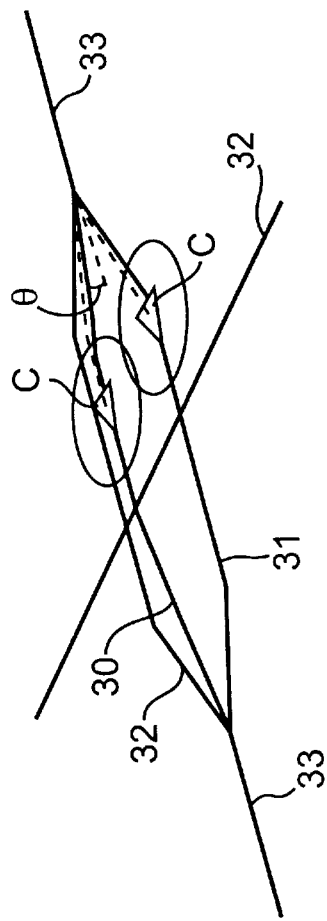
FIG. 6B is a diagram showing a concept of the navigation process for traveling the grade separation road or the side road of the embodiment.

In the process of traveling to the grade separation whose presence is recognized at the step S3, it is firstly judged whether or not the absolute value of the inclination angle θ calculated at the step S1 is equal to or more than a predetermined threshold θ2 (Step S30) in FIG. 6B. This threshold θ2 implies a threshold set by considering a typical slant when traveling from a general road 33 to a grade separation road 30, as shown in FIG. 6B.

If the absolute value of the inclination angle θ is not equal to or more than the threshold θ2 in the judgment at the step S30 (Step S30; NO), it is assumed that the vehicle C is traveling on a flat side-road 31 or 32, and then an indication implying that the vehicle C is traveling on the side-road 31 or 32 is displayed by the navigation process of using the usual map matching and the like (Step S33). The operational flow proceeds to a step S34. In the display at the step S33, for example, when the grade separation road 30 and the side-road 31 or 32 are adjacent to each other, this implies that the position mark of the vehicle C is exactly placed on the side-road 31 or 32. Moreover, for example, when the side-road 31 or 32 crosses another road under a grade separation as shown in FIG. 6B, it is noted ahead of the grade separation that the vehicle C approaches the grade separation.

On the other hand, if the absolute value of the inclination angle θ is equal to or more than the threshold θ2 at the judgment of the step S30 (Step S30 ; YES), it is assumed that the vehicle C climbs from the general road 33 and travels to the grade separation road 30, on the basis of the grade separation information among the stored road information. Then, an indication of traveling on the grade separation road 30 is displayed by the navigation process of using the usual map matching and the like (Step S31). In the display at the step S31, when the grade separation road 30 and the side-road 31 or 32 run parallel to and adjacently to each other, this implies that the position mark of the vehicle C is exactly placed on the grade separation road 30. Moreover, in a case that the vehicle C erroneously travels to the grade separation road 30 although it is scheduled to travel to the side-road 31 or 32 in a pre-executed route set, it is possible to automatically execute a new route set with the grade separation road 30 as a starting point.

Next, it is again judged whether or not the absolute value of the inclination angle θ periodically calculated at the step S1 is equal to or more than the threshold θ2 (Step S32). If it is less than the threshold θ2 (Step S32 ; NO), it is assumed that the vehicle C is continuously traveling on the grade separation road 30. Then, it is judged whether or not a signal for switching a road indication on the display 17 is inputted by the input device 11 (Step S34). If the signal for switching is inputted (Step S34 ; YES), the process corresponding to the input from the input device 11 is performed. If the signal for switching is not inputted (Step S34 ; NO), an indication of continuously traveling on the grade separation road 30 is displayed (Step S31).

On the other hand, if the absolute value of the inclination angle θ is equal to or more than the threshold θ2 in the judgment at the step S32 (Step S32 ; YES), it is assumed that the vehicle C again travels from the grade separation road 30 to the general road 33, on the basis of the grade separation information among the stored road information, and then an indication of traveling on the general road 33 is displayed (Step S35). After that, the usual navigation process is performed.

The repetition of the above explained processes at the steps S30 to S37 enables the exact execution of the navigation process, even when the grade separation road 30 and the side road 31 or 32 are parallel to and adjacent to each other.

Figure 5B:
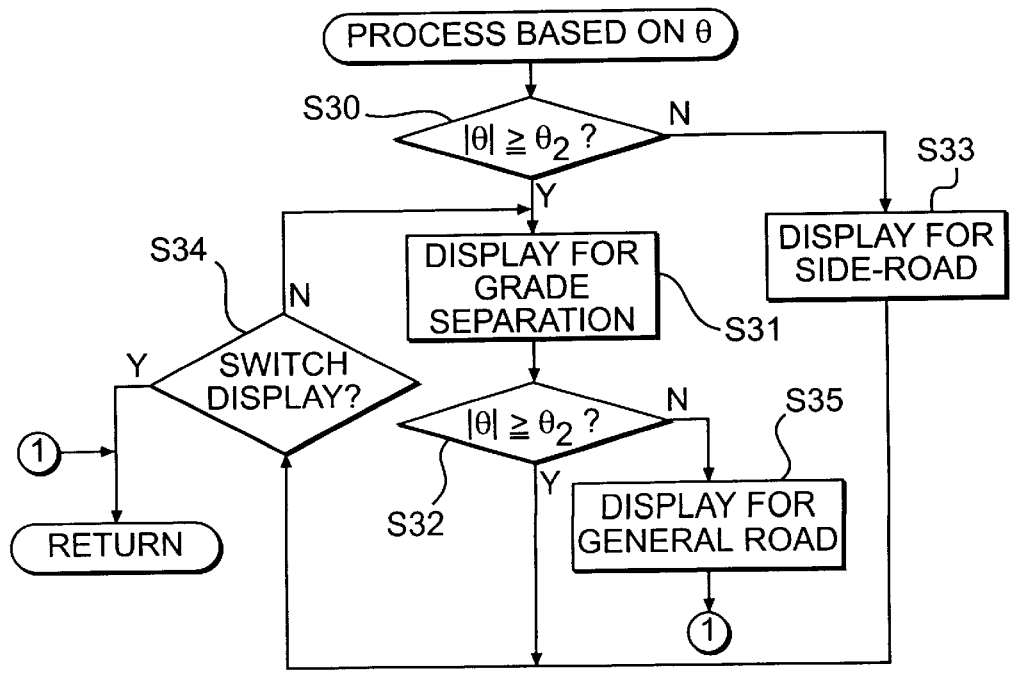
FIG. 5B is a flow chart showing a detailed operation in the navigation process for traveling a grade separation road or a side road of the embodiment.

The comparison between the absolute value of the inclination angle θ and the threshold θ2 at the step S30 or S32 enables the exact execution of a series of the processes shown in FIG. 5B, not only in the case that the grade separation road 30 runs over the side-road 31 or 32 as shown in FIG. 6B, but also in the case that the grade separation road 30 runs under the side-road 31 or 32.

(III) Distance Correcting Process

Figure 7:
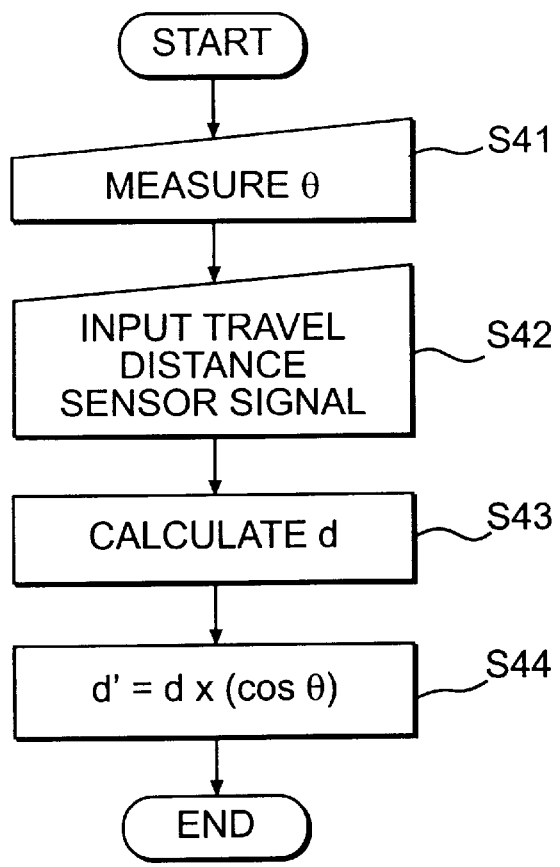
FIG. 7 is a flow chart showing an operation in a distance correcting process of the embodiment.
Figure 8:
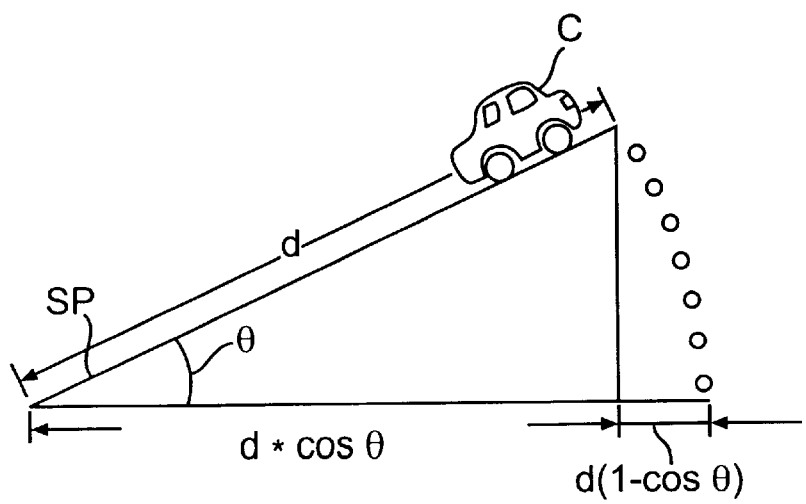
FIG. 8 is a diagram showing a concept of the distance correcting process of the embodiment.

Next, a distance correcting process in the present embodiment of the present invention is explained with reference to FIGS. 7 and 8, and FIG. 4. FIG. 7 is a flowchart showing a distance correcting process mainly executed by the CPU 7. FIG. 8 is a view showing a conception of the distance correction.

As shown in FIG. 7, in the distance correcting process, at first, the inclination angle θ of the vehicle C is firstly determined by using the method same as that in the first embodiment, which has been explained with the flow chart of FIG. 4 (Step S41).

When the output signal of the travel distance sensor 3 is inputted (Step S42), a moving distance d along the travel direction of the vehicle C is determined from the output signal (Step S43). When the vehicle C is climbing on the upward slope SP as shown in FIG. 8, this moving distance d implies a moving distance in a direction parallel to the upward slope SP.

When the moving distance d along the travel direction is calculated, a moving distance d' within a horizontal surface is calculated from an equation shown below, by using the inclination angle θ determined at the step S41 (Step S44).

$$d' = d \times \cos\theta$$

After that, the calculated moving distance d' within the horizontal surface is used to move and display the position mark in the map displayed on the display 17.

The moving distance within the horizontal surface to show, on a map displayed on the display 17, even the vehicle C traveling on the slope having the inclination angle θ is exactly calculated by the processes in the embodiment explained with reference to FIGS. 7 and 8. Thus, this enables the moving amount of the vehicle C on the map to be shown exactly and also enables the navigation process with a higher accuracy.

The process of calculating the inclination angle θ shown in FIG. 7 and the correcting process shown in FIG. 4 are always executed at a predetermined period while the navigation apparatus S is active.

The case in which the vehicle C climbs the upward slope SP is explained in the above mentioned implementation. However, the present invention is not limited thereto. Then, the present invention is similarly applied to the case in which the vehicle C travels on the down slope.

By using the inclination angle θ calculated in the embodiment, it is possible to perform the process of correcting the present position of the vehicle C after judging that the vehicle C is traveling on the upward slope or the downward slope when the inclination angle θ is equal to or more than a predetermined angle (for example, 3 degrees). Moreover, if setting the predetermined angle at this time as a threshold to remove a noise which may has influence on the calculation of the inclination angle θ, the presence or absence of the inclination (whether the vehicle C is traveling on the upward slope or the downward slope) can be judged more exactly to thereby perform the navigation process.

As mentioned above, according to the navigation apparatus S of the embodiment, it is judged from the acceleration Gc applied to the moving direction of the vehicle C and the travel distance of the vehicle C whether or not the travel direction of the vehicle C is inclined (namely, whether the vehicle C is traveling on an inclined surface (e.g. an inclined ground) or moving in a vertical direction. Hence, it is possible to exactly judge whether or not the travel direction of the vehicle C is inclined, in a simple configuration without being subjected to the effects such as the vibration associated with the movement of the vehicle C and the like.

The inclination angle θ in the travel direction of the vehicle C is calculated from the acceleration Gb based on the detected travel distance, the acceleration Gc detected by the acceleration sensor 1 and the gravitational acceleration G. Accordingly, the inclined state can be determined more exactly and actually.

When the calculated inclination angle θ is equal to or more than the predetermined angle, it is judged that the travel direction of the vehicle C is inclined. Hence, even if the noise component and the like are included in the calculated inclination angle θ, it is possible to surely judge the presence or absence of the inclination in the travel direction of the vehicle C.

The travel distance of the vehicle C is detected on the basis of the vehicle speed pulse signal. Hence, it is possible to exactly detect the moving distance to thereby judge the presence or absence of the inclination.

The moving distance along the travel direction is corrected on the basis of the judged inclination angle θ, and then displayed on the display 17. Therefore, the present position of the vehicle C can be displayed exactly.

(IV) EXPERIMENT

Figure 9A:
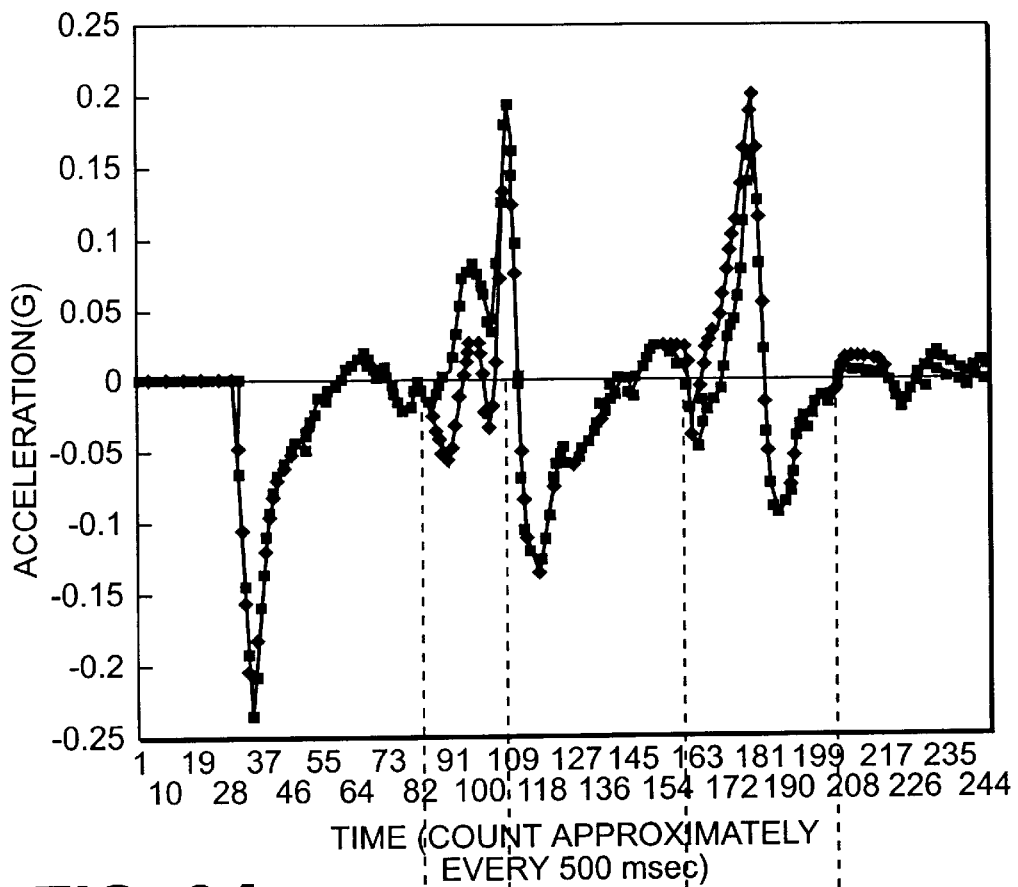
FIG. 9 is a graph showing a result (I) of an experiment, which indicates a change in an acceleration associated with the movement of a vehicle.
Figure 9B:
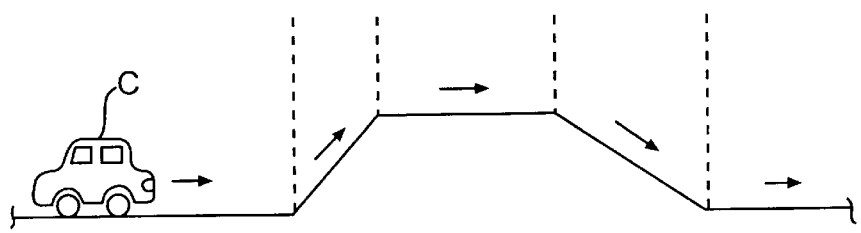
Figure 10A:
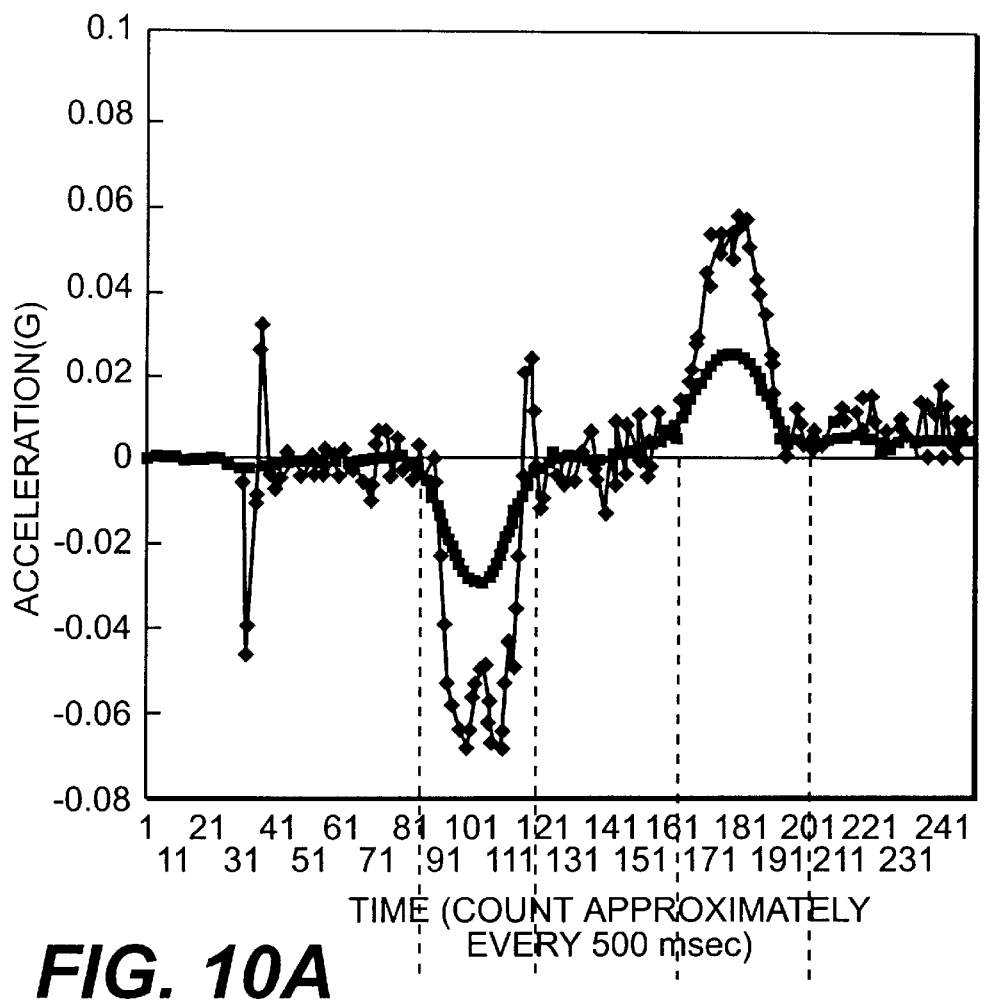
FIG. 10 is a graph showing a result (II) of an experiment, which indicates a change in an acceleration associated with the movement of a vehicle.
Figure 10B:
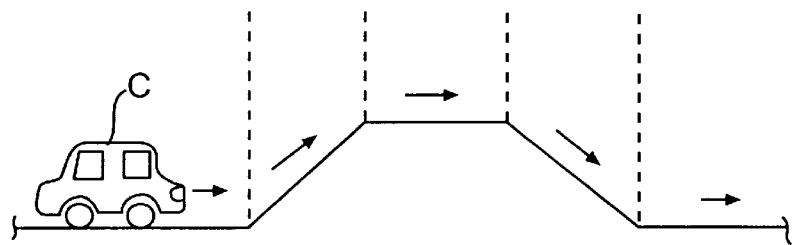

Next, a result of a vehicle travel experiment about how the accelerations Gc and Gb are varied in conjunction with the actual movement of the vehicle C is explained with reference to FIGS. 9 and 10. FIG. 9 shows the actual values of the variations of the accelerations Gc and Gb associated with the movement of the vehicle C. Black lozenges correspond to the acceleration Gc, and black squares correspond to the acceleration Gb. FIG. 10 shows variations of differences of subtracting the acceleration Gb from the acceleration Gc associated with the movement of the vehicle C. Black lozenges correspond to the differences, and black squares correspond to differences after an application of a smoothing process. Moreover, in FIGS. 9 and 10, a negative acceleration corresponds to a speedup, and a positive acceleration corresponds to a deceleration.

The relation between the positive or negative acceleration and the speedup or deceleration in FIGS. 9 and 10 is reversed when a mount direction (a sensitive axis direction) of the acceleration sensor 1 is rotated by 180 degrees with respect to the travel direction of the vehicle C. Namely, when the sensitive axis direction of the acceleration sensor 1 is rotated by 180 degrees with respect to the travel direction of the vehicle C, the positive acceleration corresponds to the speedup, and the negative acceleration corresponds to the deceleration.

As shown in FIGS. 9 and 10, the difference between the accelerations Gc and Gb is extremely small when the vehicle is traveling on a horizontal surface, namely, traveling on a flat ground.

However, the value of the acceleration Gc becomes smaller than that of the acceleration Gb, on the upward slope (a time between 80 counts and 110 counts). This case implies that a component Ga of the gravitational acceleration G in the travel direction of the vehicle C is applied to a direction opposite to the advance direction of the vehicle C.

On the other hand, the value of the acceleration Gc becomes larger than that of the acceleration Gb, on the downward slope (a time between 155 counts and 200 counts). This case implies that the component Ga of the gravitational acceleration G in the travel direction of the vehicle C is applied to a direction identical to the advance direction of the vehicle C.

In this embodiment, the inclination angle θ is actually calculated by using the value after the smoothing process (corresponding to the step S15 of FIG. 4) shown by the black squares in FIG. 10. Accordingly, the travel distance of the vehicle C is corrected and then displayed on the display 17.

As explained above, according to the processes of the navigation apparatus S, it is possible to display the present position, including the presence or absence of the movement in the vertical direction of the vehicle C (namely, a movement on an inclined surface), to thereby display the movement condition of the vehicle C more properly.

It is possible to recognize the present position on the map displayed on the display 17, including the presence or absence of the movement in the vertical direction of the vehicle, to thereby recognize the present position more exactly.

It is possible to recognize the present position more exactly, even when traveling on one of roads which are adjacent to each other and different in altitude from each other.

The presence or absence of the movement in the vertical direction is detected from the acceleration Gc applied to the vehicle and the acceleration Gb calculated from the travel distance of the vehicle. Hence, without being subject to the effects, such as the vibration and the like, associated with the movement of the vehicle C, it is possible to exactly determine the presence or absence of the movement under the simple configuration to thereby determine the position in the vertical direction.

It is possible to recognize whether or not the vehicle is traveling on the overpass or the underpass at the grade separation. Thus, it is possible to exactly recognize the present position even when traveling through the grade separation to thereby perform the navigation process with the higher accuracy.

It is possible to recognize one of the express way 25 and the general road 26 which the vehicle C is traveling on. Hence, the present position can be recognized more exactly even at the location at which the express way 25 and the general road 26 are adjacent to each other to thereby perform the navigation process with the higher accuracy.

In the above mentioned embodiment, the inclination angle θ is calculated by comparing the acceleration Gc with the acceleration Gb. However, the present invention is not limited thereto. Then, the inclination angle θ may be calculated by integrating one time the acceleration Gc with respect to the time so as to determine the speed and further comparing the determined speed with the speed calculated by differentiating one time the distance data from the travel distance sensor 3.

The inclination angle θ may be calculated by integrating two times the acceleration Gc with respect to the time so as to determine the travel distance and further comparing the determined travel distance with the distance data.

In the above mentioned embodiment, the embodiment is explained which uses the accelerations Gc and Gb to actually calculate the inclination angle θ. However, as can be seen from the above mentioned descriptions, if understanding the large and small relation between the accelerations Gc and Gb and even if the actual inclination angle θ is not known, it is possible to at least determine whether the vehicle C exists on the upward slope or the downward slope to thereby determine the presence or absence of the movement in the vertical direction of the vehicle C. Therefore, it is possible to determine only the fact that the vehicle C exists on the upward slope or the downward slope and, by using the information with regard to the grade separation among the road information and the information with regard to the upper and lower relation between the express way 25 and the general road 26, perform the process of moving the position mark on the display picture of the display 17 onto the road, which the vehicle C should be originally traveling on, to then display it.

It may be constructed such that the program corresponding to the flowcharts shown in FIGS. 2, 4 and 5 is stored in advance in the DVD ROM disk DK1 or the CD-ROM disk DK2 and then it is read out and executed when performing the process of using the inclination angle θ. In this case, it is possible to reduce a memory capacity of the ROM 8.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation apparatus comprising:
    a vertical movement detecting device for detecting a presence or absence of a movement in a vertical direction of a movable body associated with the movement of said movable body;
    a judging device for judging a position in the vertical direction of said movable body on the basis of the presence or absence of the movement in the vertical direction detected by said vertical movement detecting device; and
    a notifying device for notifying a present position of said movable body on the basis of the position in the vertical direction judged by said judging device,
    wherein said vertical movement detecting device further comprises
        (i) means for calculating Ga=Gc−Gb wherein Ga represents a component of a gravitational acceleration G in a moving direction of said movable body, Gb represents an acceleration in the moving direction obtained by differentiating a moving distance of said movable body twice with respect to time, and Gc represents an acceleration in the moving direction detected by an acceleration sensor of said movable body,
        (ii) means for calculating an inclination angle of said movable body $\theta=\sin^{-1}(|Ga|/|G|)$ by using the calculated Ga, and
        (iii) means for comparing the calculated inclination angle $\theta$ with a predetermined threshold value to thereby detect the presence or absence of the movement in the vertical direction.

2. A navigation apparatus according to claim 1, wherein said notifying device comprises at least one of a display device for visually notifying the present position and an acoustic reproducing device for audibly notifying the present position.

3. A navigation apparatus comprising:
    a vertical movement detecting device for detecting a presence or absence of a movement in a vertical direction of a movable body associated with the movement of said movable body;
    a judging device for judging whether or not said movable body moves on an inclined surface on the basis of the presence or absence of the movement in the vertical direction detected by said vertical movement detecting device; and
    a notifying device for notifying a present position of said movable body on the basis of a judgment result of said judging device,
    wherein said vertical movement detecting device further comprises
        (i) means for calculating Ga=Gc−Gb wherein Ga represents a component of a gravitational acceleration G in a moving direction of said movable body, Gb represents an acceleration in the moving direction obtained by differentiating a moving distance of said movable body twice with respect to time, and Gc represents an acceleration in the moving direction detected by an acceleration sensor of said movable body,
        (ii) means for calculating an inclination angle of said movable body $\theta=\sin^{-1}(|Ga|/|G|)$ by using the calculated Ga, and
        (iii) means for comparing the calculated inclination angle $\theta$ with a predetermined threshold value to thereby detect the presence or absence of the movement in the vertical direction.

4. A navigation apparatus according to claim 3, wherein said notifying device comprises at least one of a display device for visually notifying the present position and an acoustic reproducing device for audibly notifying the present position.

5. A navigation apparatus comprising:
    a recognizing device for recognizing a present position of a movable body;
    a storing device for storing map information including a region where said movable body moves; and
    a vertical movement detecting device for detecting a presence or absence of a movement in a vertical direction of said movable body associated with the movement of said movable body,
    wherein said recognizing device recognizes the present position of said movable body on the basis of the map information stored by said storing device and the presence or absence of the movement in the vertical direction detected by said vertical movement detecting device,
    wherein said vertical movement detecting device further comprises
        means for calculating Ga=Gc−Gb wherein Ga represents a component of a gravitational acceleration G in a moving direction of said movable body, Gb represents an acceleration in the moving direction obtained by differentiating a moving distance of said movable body twice with respect to time, and Gc represents an acceleration in the moving direction detected by an acceleration sensor of said movable body,
        means for calculating an inclination angle of said movable body $\theta=\sin^{-1}(|Ga|/|G|)$ by using the calculated Ga, and
        means for comparing the calculated inclination angle $\theta$ with a predetermined threshold value to thereby detect the presence or absence of the movement in the vertical direction.

6. A navigation apparatus according to claim 5, wherein said movable body is a vehicle,
    the map information includes altitudinal difference information indicating altitudinal differences between a plurality of roads, and
    said recognizing device uses the altitudinal difference information stored by said storing device and the presence or absence of the movement in the vertical direction detected by said vertical movement detecting device to thereby recognize one of said plurality of roads on which the vehicle is traveling.

7. A navigation apparatus according to claim 6, wherein said vertical movement detecting device comprises:
    an acceleration detecting device for detecting the acceleration Gc; and
    a moving distance detecting device for detecting the moving distance.

8. A navigation apparatus according to claim 6, wherein said plurality of roads comprise a plurality of roads constituting a grade separation, and
    said recognizing device recognizes whether or not said vehicle is moving on one of said roads at an upper side of the grade separation or moving on another of said roads at a lower side of the grade separation.

9. A navigation apparatus according to claim 6, wherein said plurality of roads comprise an express way and a general road other than the express way, and further said recognizing device recognizes one of the express way and the general road on which said vehicle is moving.

10. A navigation apparatus according to claim 6, further comprising:
a display device for displaying a map corresponding to the map information; and
a display control device for controlling said display device to display the map including the present position of said movable body and display the present position recognized by said recognizing device on the road to which the present position within said displayed map corresponds.

11. A movement judging apparatus comprising:
an acceleration detecting device for detecting an acceleration Gc applied to a movable body in a moving direction of said movable body;
a moving distance detecting device for detecting a moving distance along the moving direction of said movable body; and
a judging device for judging whether or not the moving direction of said movable body is inclined,
wherein said judging device further comprises
(i) means for calculating Ga=Gc−Gb wherein Ga represents a component of a gravitational acceleration G in a moving direction of said movable body and Gb represents an acceleration in the moving direction obtained by differentiating the moving distance twice with respect to time,
(ii) means for calculating an inclination angle of said movable body $\theta=\sin^{-1}(|Ga|/|G|)$ by using the calculated Ga, and
(iii) means for comparing the calculated inclination angle $\theta$ with a predetermined threshold value to thereby judge whether or not said movable body moves on the inclined surface according to a comparison result.

12. A movement judging apparatus according to claim 11, wherein said moving distance detecting device calculates the moving distance on the basis of a speed signal corresponding to the movement of said movable body.

13. A movement judging apparatus comprising:
an acceleration detecting device for detecting an acceleration Gc applied to a movable body in a moving direction of said movable body;
a moving distance detecting device for detecting a moving distance along the moving direction of said movable body; and
a judging device for judging a presence or absence of a movement in a vertical direction of said movable body,
wherein said judging device further (i) calculates Ga=Gc−Gb wherein Ga represents a component of a gravitational acceleration G in a moving direction of said movable body and Gb represents an acceleration in the moving direction obtained by differentiating the moving distance twice with respect to time, (ii) calculates an inclination angle of said movable body $\theta=\sin^{-1}(|Ga|/|G|)$ by using the calculated Ga, and (iii) compares the calculated inclination angle $\theta$ with a predetermined threshold value to thereby judge the presence or absence of the movement in the vertical direction of said movable body according to a comparison result.

14. A movement judging apparatus according to claim 13, wherein said moving distance detecting device calculates the moving distance on the basis of a speed signal corresponding to the movement of said movable body.

15. A navigation apparatus comprising
(a) a movement judging apparatus comprising:
an acceleration detecting device for detecting an acceleration Gc applied to a movable body in a moving direction of said movable body;
a moving distance detecting device for detecting a moving distance along the moving direction of said movable body; and
a judging device for judging whether or not the moving direction of said movable body is inclined,
wherein said judging device (i) calculates Ga=Gc−Gb wherein Ga represents a component of a gravitational acceleration G in a moving direction of said movable body and Gb represents an acceleration in the moving direction obtained by differentiating the moving distance twice with respect to time, (ii) calculates an inclination angle of said movable body $\theta=\sin^{-1}(|Ga|/|G|)$ by using the calculated Ga, and (iii) compares the calculated inclination angle $\theta$ with a predetermined threshold value to thereby judge whether or not said movable body moves on the inclined surface according to a comparison result,
(b) a correcting device for correcting the moving distance detected by said moving distance detecting device, on the basis of a judgment result of said judging device, and
(c) a display device for displaying a moving condition including a present position of said movable body, on the basis of the moving distance corrected by said correcting device.

16. A navigation apparatus comprising
(a) a movement judging apparatus comprising:
an acceleration detecting device for detecting an acceleration applied to a movable body in a moving direction of said movable body;
a moving distance detecting device for detecting a moving distance along the moving direction of said movable body; and
a judging device for judging a presence or absence of a movement in a vertical direction of said movable body,
wherein said judging device (i) calculates Ga=Gc−Gb wherein Ga represents a component of a gravitational acceleration G in a moving direction of said movable body and Gb represents an acceleration in the moving direction obtained by differentiating the moving distance twice with respect to time, (ii) calculates an inclination angle of said movable body $\theta=\sin^{-1}(|Ga|/|G|)$ by using the calculated Ga, and (iii) compares the calculated inclination angle $\theta$ with a predetermined threshold value to thereby judge the presence or absence of the movement in the vertical direction of said movable body according to a comparison result,
(b) a correcting device for correcting the moving distance detected by said moving distance detecting device, on the basis of a judgment result of said judging device, and
(c) a display device for displaying a moving condition including a present position of said movable body, on the basis of the moving distance corrected by said correcting device.

* * * * *